(12) United States Patent
Saubhasik et al.

(10) Patent No.: US 11,436,047 B2
(45) Date of Patent: Sep. 6, 2022

(54) SYSTEM AND METHOD FOR PROCESSING INFORMATION HIERARCHY MANAGEMENT

(71) Applicant: Arista Networks, Inc., Santa Clara, CA (US)

(72) Inventors: Mayukh Saubhasik, Richmond (CA); Imtiyaz Mohammad, Bangalore (IN); Sriram Sellappa, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 321 days.

(21) Appl. No.: 16/533,332

(22) Filed: Aug. 6, 2019

(65) Prior Publication Data
US 2021/0042152 A1    Feb. 11, 2021

(51) Int. Cl.
*G06F 9/46* (2006.01)
*G06F 9/48* (2006.01)

(52) U.S. Cl.
CPC ................. *G06F 9/4881* (2013.01)

(58) Field of Classification Search
CPC .................................................. G06F 9/4881
See application file for complete search history.

(56) References Cited

U.S. PATENT DOCUMENTS

2018/0097725 A1* 4/2018 Wood ..................... H04L 45/42

OTHER PUBLICATIONS

Rosen et al., "Multiprotocol Label Switching Architecture", Standards Track, 2001 (61 pages).

* cited by examiner

*Primary Examiner* — Wissam Rashid
(74) *Attorney, Agent, or Firm* — Fountainhead Law Group P.C.

(57) ABSTRACT

In general, embodiments described herein relate to methods and systems for reorganizing processing information hierarchies to remove duplicative and/or redundant portions of a processing information hierarchy such that they, for example, require fewer resources of the network devices on which they are stored.

20 Claims, 8 Drawing Sheets

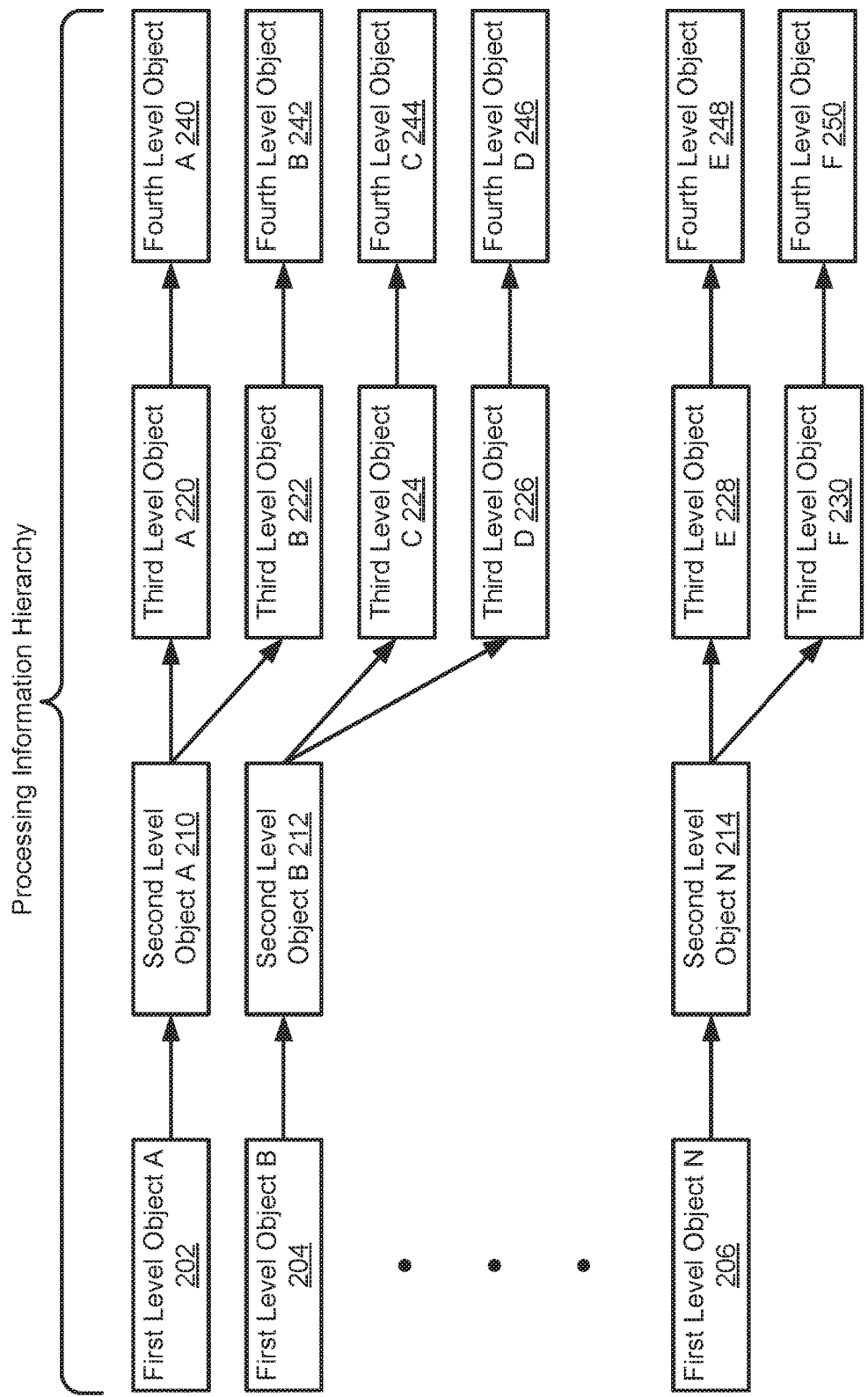
FIG. 2.1

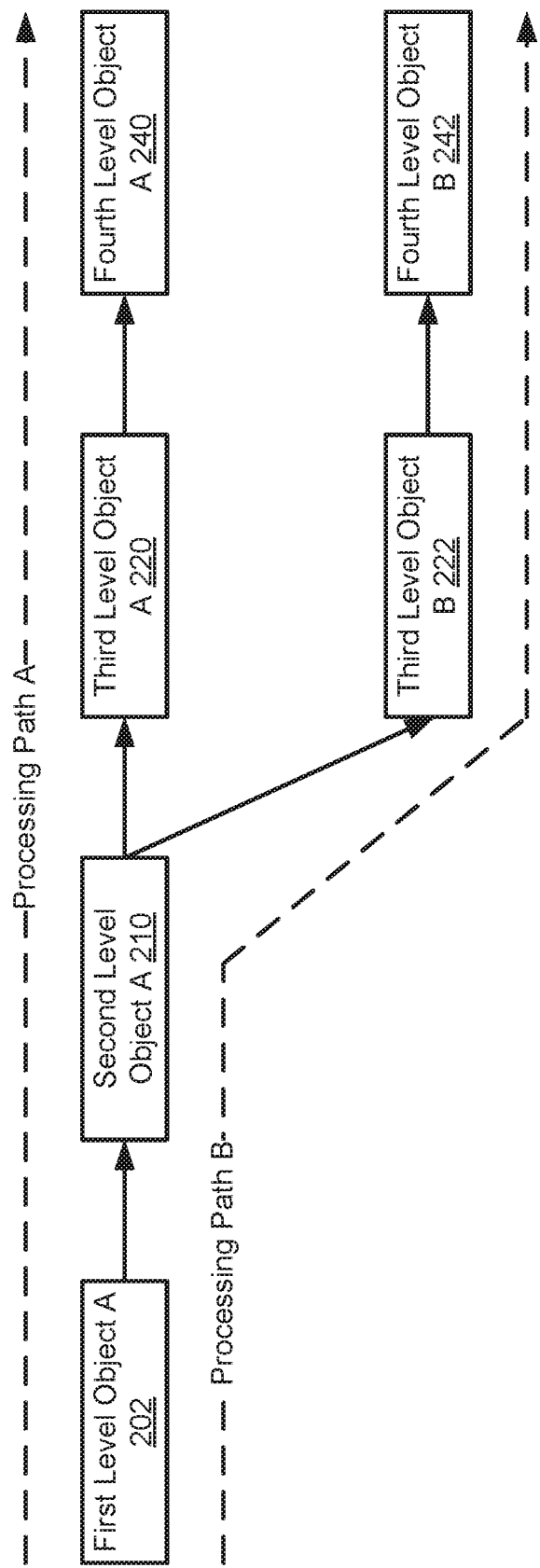
FIG. 2.2

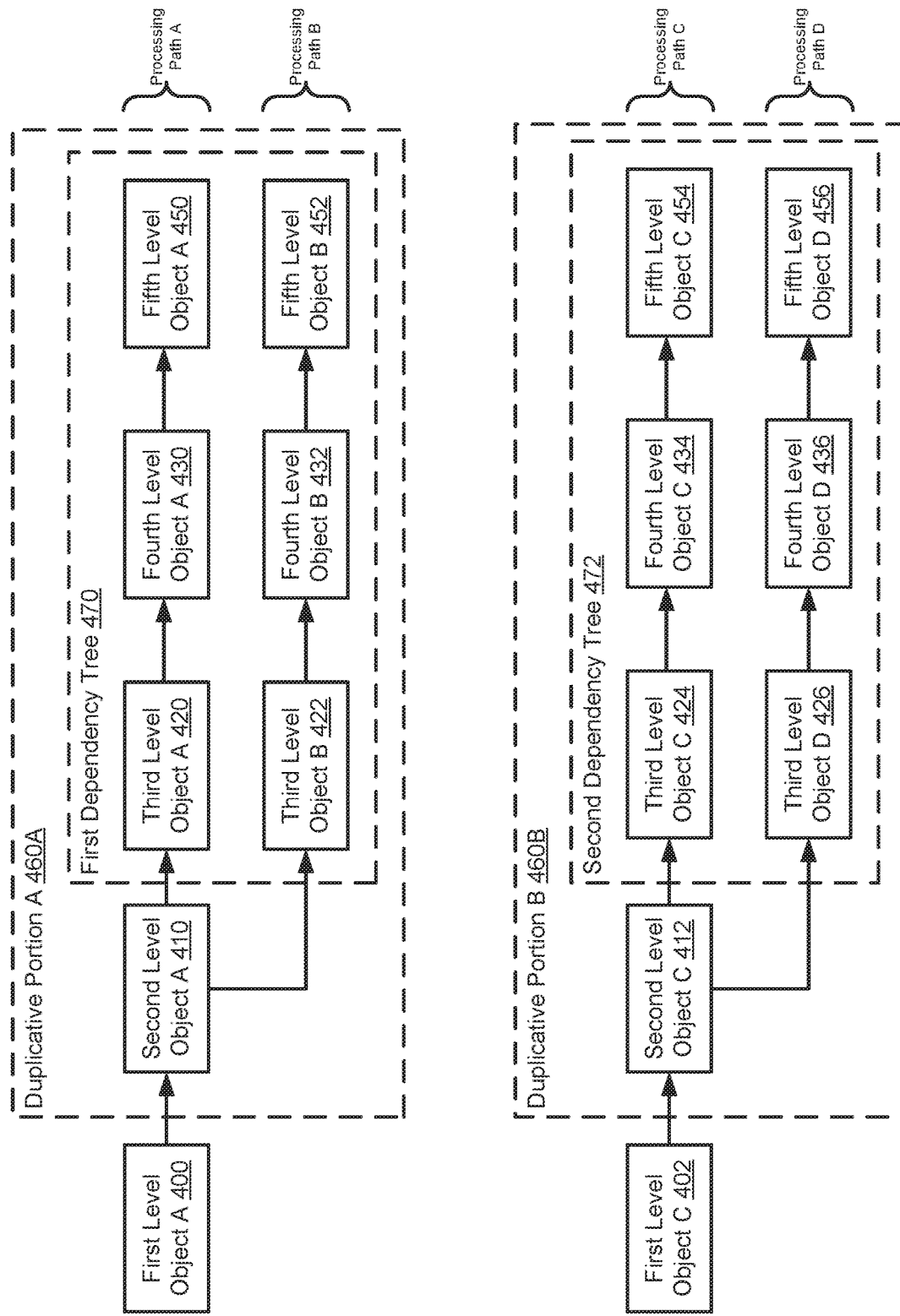
FIG. 4.1

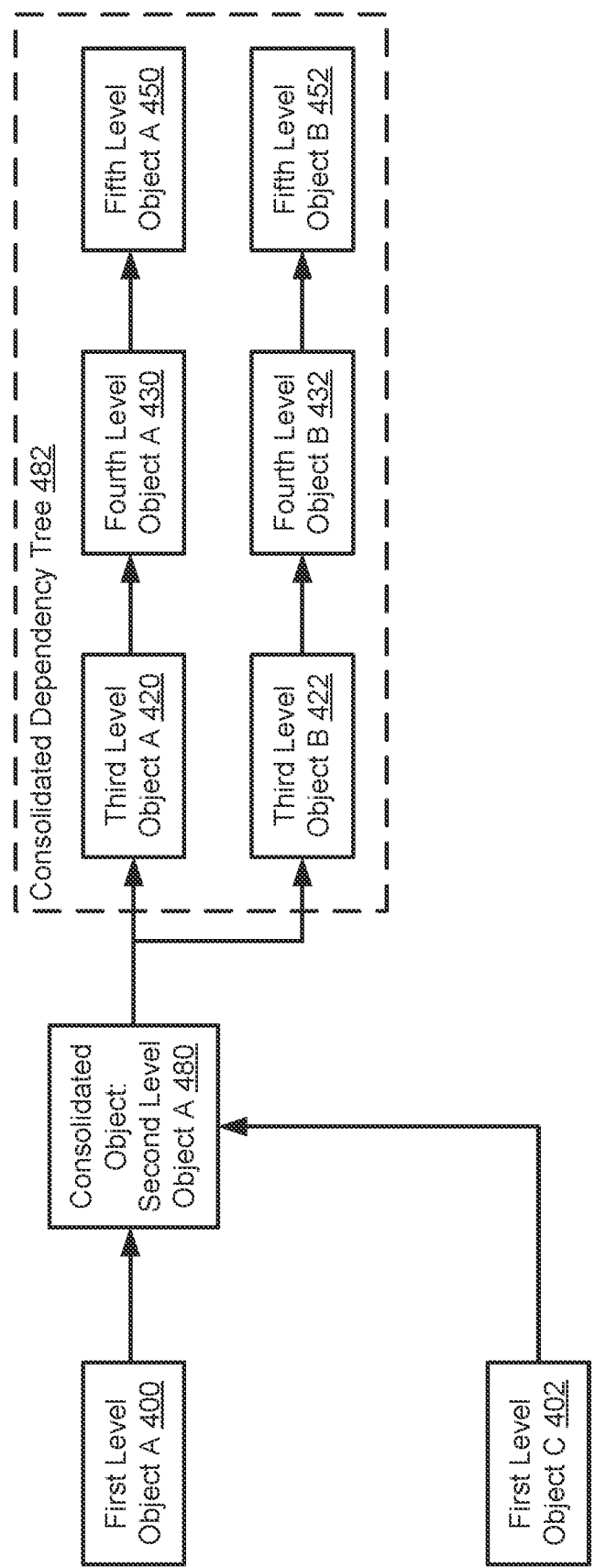
FIG. 4.2

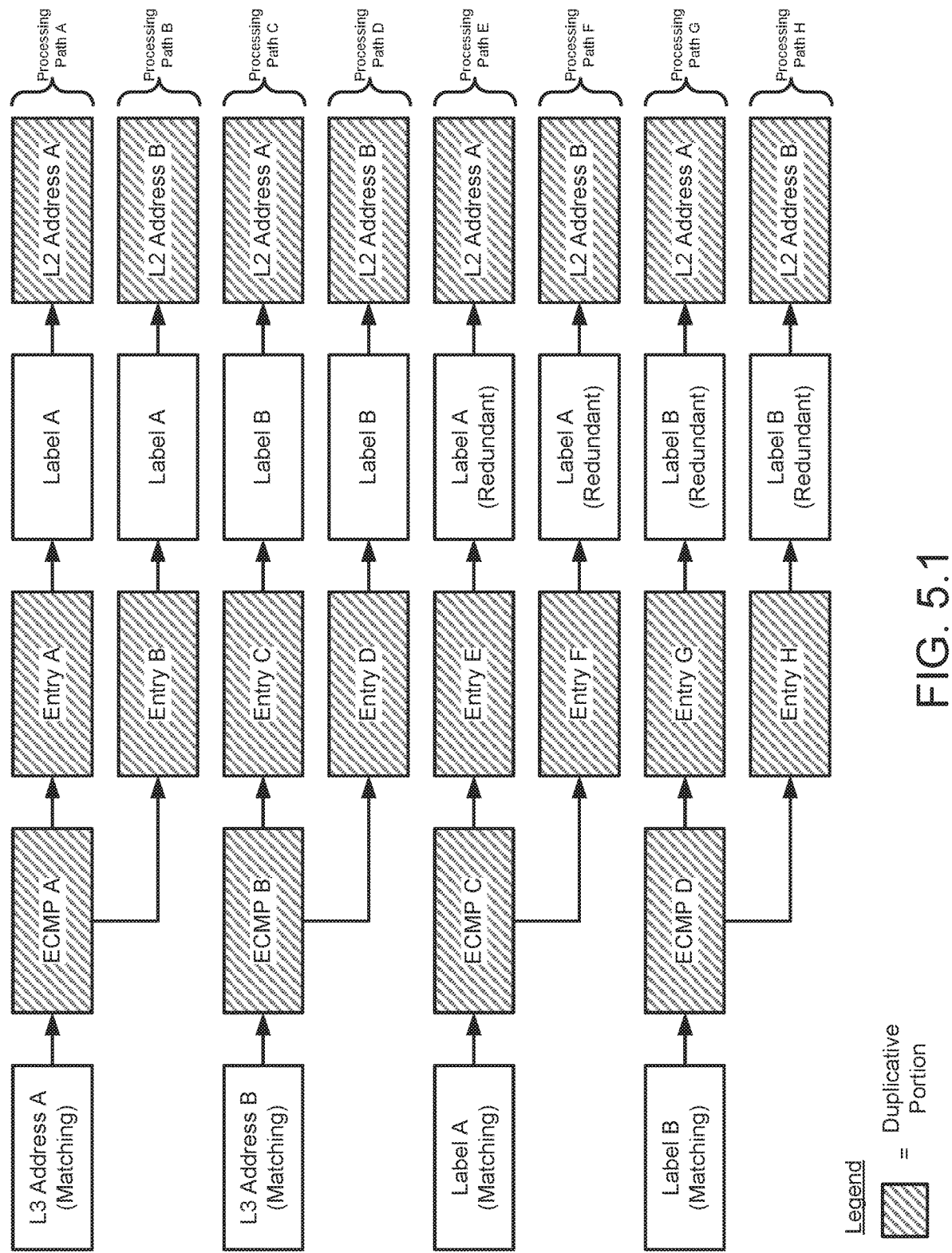
FIG. 5.1

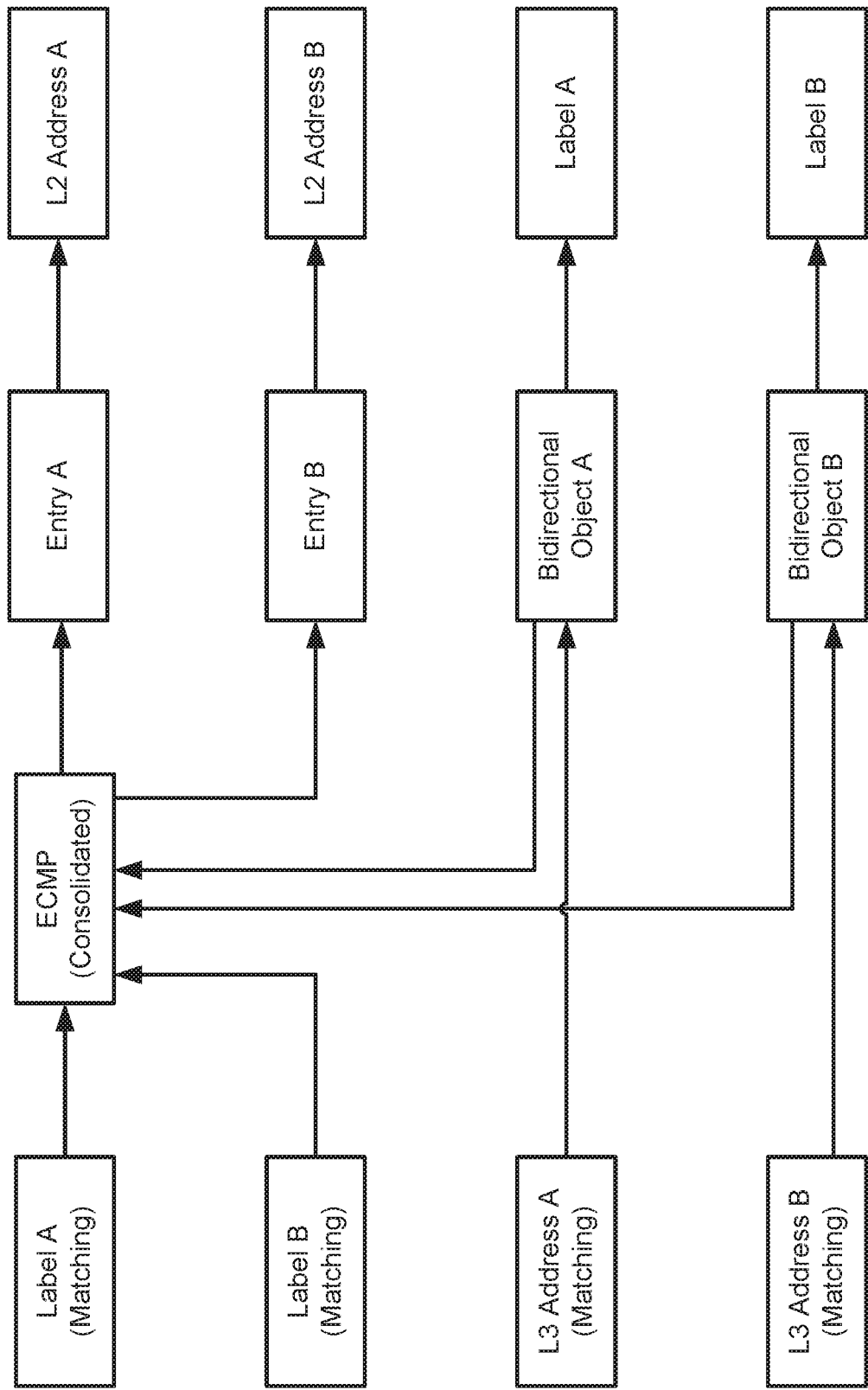
FIG. 5.2

US 11,436,047 B2

SYSTEM AND METHOD FOR PROCESSING INFORMATION HIERARCHY MANAGEMENT

CROSS-REFERENCE TO RELATED APPLICATIONS

This application is related to U.S. patent application Ser. No. 16/533,558, filed on Aug. 6, 2019, and entitled: "OPTIMIZED PROGRAMMING OF FORWARDING DATA IN NETWORK DEVICE HARDWARE."

BACKGROUND

Network devices may provide traffic management services to manage network traffic. The traffic management services may include receiving network data units and processing the network data units to destination devices. When processing such network data units, the network devices may send the network data units to any number of intermediary network devices before the forwarded network data units are received by the destination devices.

SUMMARY

In general, in one aspect, the invention relates to a network device, comprising a hardware component, and a processing information hierarchy manager to: obtain a processing information hierarchy, make a determination that the processing information hierarchy comprises a duplication or a redundancy, reorganize the processing information hierarchy based on the determination to obtain a reorganized processing information hierarchy, and program the processing information hierarchy into the hardware component.

In general, in one aspect, the invention relates to a method, that comprises obtaining a processing information hierarchy, making a determination that the processing information hierarchy comprises a duplication or a redundancy, reorganizing the processing information hierarchy based on the determination to obtain a reorganized processing information hierarchy and programming the processing information hierarchy into the hardware component.

In general, in one aspect, the disclosure is related to the non-transitory computer readable medium comprising instructions that, when executed by a processor, perform a method comprising: obtaining a processing information hierarchy, making a determination that the processing information hierarchy comprises a duplication or a redundancy, reorganizing the processing information hierarchy based on the determination to obtain a reorganized processing information hierarchy, and programming the processing information hierarchy into the hardware component.

BRIEF DESCRIPTION OF DRAWINGS

Certain embodiments will be described with reference to the accompanying drawings. However, the accompanying drawings illustrate only certain aspects or implementations of the embodiments by way of example and are not meant to limit the scope of the claims.

FIGS. 2.1-2.2 show diagrams of an example processing information hierarchy in accordance with one or more embodiments disclosed herein.

FIGS. 4.1-4.2 show diagrams of an example Processing Information Hierarchy as it is deduplicated and reorganized.

FIGS. 5.1-5.2 show diagrams of an example processing information hierarchy as it is deduplicated and reorganized.

DETAILED DESCRIPTION

Figure 1:
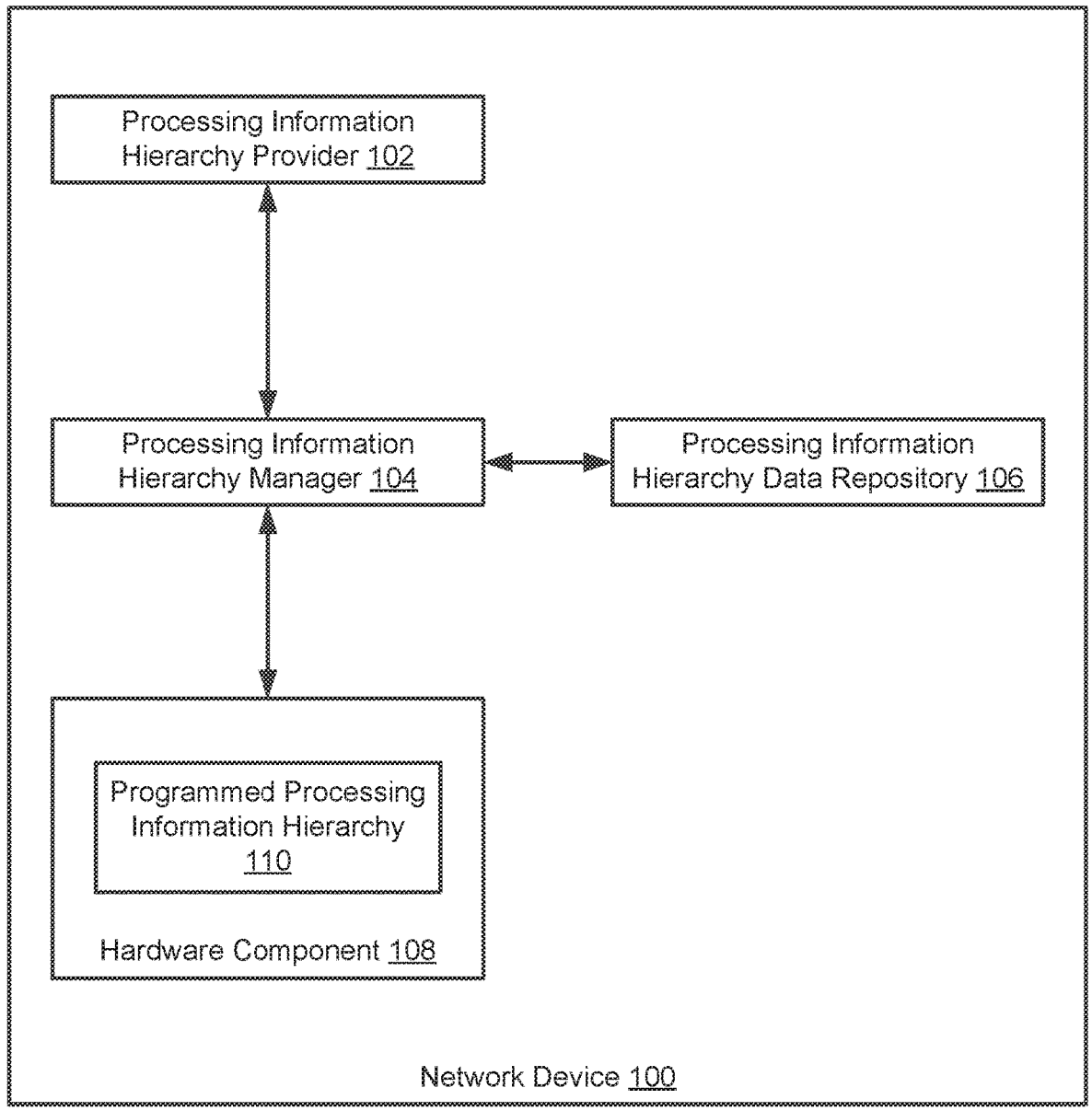
FIG. 1 shows a diagram of an example system in accordance with one or more embodiments disclosed herein.

Specific embodiments will now be described with reference to the accompanying figures. In the following description, numerous details are set forth as examples. It will be understood by those skilled in the art, and having the benefit of this Detailed Description, which one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods and systems for reorganizing processing information hierarchies to remove duplicative and/or redundant portions of a processing information hierarchy such that they, for example, require fewer resources of the network devices on which they are stored. Specifically, in one or more embodiments, obtained processing information hierarchies are assessed to determine whether duplications or redundancies are included in the hierarchies. A duplication may be any identical portions of two or more processing paths (see e.g., FIGS. 2.1-2.2). A redundant portion may be any portion of a given processing path that does not need to be performed. See e.g., FIGS. 5.1-5.2. In one or more embodiments, the processing information hierarchies are re-organized by consolidating one or more duplications and/or removing one or more redundant portions.

FIG. 1 shows a network device in accordance with one or more embodiments described herein. As shown in FIG. 1, the network device (100) includes a processing information hierarchy provider (102), a processing information hierarchy manager (104), a processing information hierarchy data repository (106), and at least one hardware component (108). A hardware component (108) may include a programmed processing information hierarchy (110). Each of these components is described below.

In one or more embodiments, a network device (100) is a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (100) include, but are not limited to, a network switch, a router, a multilayer switch, a fiber channel device, an InfiniBand® device, etc. A network device (100) is not limited to the aforementioned specific examples.

In one or more embodiments, a network device (100) includes functionality to receive network traffic data units (e.g., frames, packets, tunneling protocol frames, etc.) at any of the physical network interfaces (i.e., ports) of the network device (100) and to process the network traffic data units. In one or more embodiments, processing a network traffic data unit includes, but is not limited to, a series of one or more table lookups (e.g., longest prefix match (LPM) lookups, processing information lookups, etc.) and corresponding actions (e.g., forward from a certain egress port, add a labeling protocol header, rewrite a destination address, encapsulate, etc.). Such a series of lookups and corresponding actions may be referred to as a pipeline. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device (100). One or more actions to be taken with regards to a received network traffic data unit may be obtained by a network device based on the network traffic data unit being recognized as falling within a processing information hierarchy object, which may have one or more associated actions and/or items of information relevant to processing the network traffic data unit (e.g., label switched path protocol actions, multipath information, egress interface information, etc.). Additional details about the processing information hierarchy objects are provided, e.g., in FIGS. 2.1-2.2.

In one or more embodiments, a network device also includes and/or is operatively connected to device storage and/or device memory (i.e., non-transitory computer readable mediums) storing software and/or firmware.

Such software and/or firmware may include instructions which, when executed by the one or more processors (not shown) of a network device (100), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (100) is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (100)) that facilitate network connectivity for one or more operatively connected devices (e.g., computing devices, data storage devices, other network devices, etc.). In one or more embodiments, the network device (100) and other devices within the network (not shown) are arranged in a network topology (not shown). In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s)(not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

In one or more embodiments, a network device (100) includes and/or is operatively connected to a processing information hierarchy provider (102). In one or more embodiments, a processing information hierarchy provider (102) is hardware (e.g., circuitry) and/or a combination of hardware and software that includes functionality including, but not limited to, providing a processing information hierarchy. In one or more embodiments, a processing information hierarchy includes a set of processing information hierarchy objects. A processing information hierarchy object may include information relating to actions to be performed upon receipt of a network traffic data unit having one or more characteristics (e.g., destination address, source address, etc.) that identify the network traffic data unit as being within a processing information hierarchy object. Such information/actions may include, but are not limited to: identification of an egress interface out of which the network traffic data unit is to be forwarded to a next-hop device; adding a Multiprotocol Label Switching (MPLS) label; rewriting source or destination media access control (MAC) header information; encapsulating the network traffic data unit in accordance with a tunneling protocol (e.g., Virtual eXtensible Local Area Network (VXLAN)) header; etc.

Additionally, a processing information hierarchy object in a processing information hierarchy may include a pointer to another processing information hierarchy object. As used herein, the term 'pointer' may refer to any type of information in a processing information hierarchy object identifying another processing information hierarchy object (or a portion of the processing information hierarchy object). The pointer may signify that a link (or relationship) exists between the two processing information hierarchy objects.

In one or more embodiments, a processing information hierarchy object that includes identifying information for a given processing information hierarchy object and a pointer to another processing information hierarchy object adds a level of indirection to a processing information hierarchy. A chain of such entries, in which one processing information hierarchy object points to another processing information hierarchy object, which points to another processing information hierarchy object, etc., may have a number of levels of indirection. A processing information hierarchy may include any number of levels of indirection.

In one or more embodiments, a processing information hierarchy provider (102) may be platform agnostic, meaning that the processing information hierarchy provider (102) may not need to take into account the capabilities of the underlying hardware into which a processing information hierarchy is to be programmed. Accordingly, in one or more embodiments, a processing information hierarchy provider (102) may provide any processing information hierarchy that is deemed the most desirable based on any parameters available to the processing information hierarchy provider (102). The resulting processing information hierarchy may include any number of levels of indirection and/or be of any size (i.e., include any number of processing information hierarchy objects).

In one or more embodiments, a given processing information hierarchy object may include a pointer to another processing information hierarchy object as well as additional information and/or actions. In one or more embodiments, any number of higher-level processing information entries in a processing information hierarchy may include pointers to the same lower-level processing information hierarchy object. For additional details regarding an example structure of a processing information hierarchy, refer to FIGS. 2.1-2.2.

In one or more embodiments, a processing information hierarchy provider (102) may be any type of entity that seeks to utilize a processing information hierarchy to perform certain functionality. For example, a processing information hierarchy provider (102) may be a software agent executing using hardware resources of a network device (100) to implement, at least in part, the Border Gateway Protocol (BGP) for the network device, and, as such, may generate a processing information hierarchy to implement BGP related routing functionality on the network device (100). Other examples of protocols or network implementation schemes that may use a processing information hierarchy include, but are not limited to, MPLS, equal cost multi-path (ECMP), Open Shortest Path First (OSPF), etc.

In one or more embodiments, a network device (100) includes and/or is operatively connected to a processing information hierarchy manager (104). In one or more embodiments, a processing information hierarchy manager (104) is hardware (e.g., circuitry) and/or a combination of hardware and software that includes functionality including, but not limited to, performing all or a portion of the method shown in FIG. 3.

In one or more embodiments, deduplicating a processing information hierarchy refers to identifying at least two processing information hierarchy objects that may be consolidated without impacting the utility of the processing information hierarchy. Such identified processing information hierarchy objects and/or other processing information hierarchy objects associated with the identified processing information hierarchy objects may not be programmed into the hardware components (108), which may reduce the resources required by the hardware component (108) to utilize the reorganized processing information hierarchy.

In one or more embodiments, reorganizing a processing information hierarchy refers to restructuring links between processing information hierarchy objects. For example, new links may be added, existing links may be removed, etc. Reorganizing the processing information hierarchy may reduce the resources required by the hardware component (108) to utilize the reorganized processing information hierarchy. For example, the number of levels of indirection of a processing information hierarchy may be reduced by reorganizing the processing information hierarchy.

In one or more embodiments, a processing information hierarchy manager (104) is operatively connected to a processing information hierarchy provider (102). For example, a data path may exist between a processing information hierarchy provider (102) and a processing information hierarchy manager (104) that uses shared memory (not shown) as the mechanism by which the processing information hierarchy manager (104) obtains a processing information hierarchy from a processing information hierarchy provider (102). In one or more embodiments, a processing information hierarchy manager includes software executing on hardware of the network device, and logically exists within a hardware abstraction layer such that it provides the capability of programming (or causing the programming of) processing information hierarchies from processing information hierarchy providers to one or more hardware components (e.g., hardware component (108)).

In one or more embodiments, a processing information hierarchy manager (104) is operatively connected to a processing information hierarchy data repository (106). In one or more embodiments, a data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments, a processing information hierarchy data repository (106) includes functionality to store data that may be used by a processing information hierarchy manager (104) when performing processing information hierarchy reorganization, and/or programming actions.

For example, if a processing information hierarchy has previously been reorganized, then a new structure of the reorganized processing information hierarchy may be stored. In such an example, if a different hardware component requires the reorganized processing information hierarchy to be programmed, the processing information hierarchy manager may obtain the previously stored processing information hierarchy. The obtained processing information hierarchy may be re-used for the different hardware component, thereby saving time and computational load on the hardware of the network device.

In one or more embodiments, the processing information hierarchy manager is also operatively connected to at least one hardware component (108). In one or more embodiments, a hardware component (108) is any hardware (e.g., circuitry such as, for example, application specific integrated circuits (ASICs)), which may include and/or be programmed by/with software and/or firmware, that includes functionality related to receiving, processing, and/or transmitting network traffic data units in accordance with one or more embodiments described herein. In one or more embodiments, a hardware component (108) is a packet processor (e.g., a network chip), a field programmable gate array (FPGA), and/or any other component into which a processing information hierarchy (e.g., original and/or reorganized) may be programmed.

In one or more embodiments, the network device (100) includes any number of hardware components (108) (e.g., network chips, field programmable gate arrays (FPGAs), etc.).

In order to perform the aforementioned functionality, a hardware component may include any number of subcomponents (not shown). Such subcomponents may include, but are not limited to, one or more processors, one or more buffers, any type or amount of storage of any type for storing hardware tables (e.g., processing information hierarchies). Such tables may control, at least in part, various aspects of the operation of a network device (100), such as functionality related to network traffic data unit processing, maximum transmission unit enforcement, encapsulation/decapsulation, address rewrites, etc. Examples of storage for hardware tables may include, but are not limited to, tertiary content addressable memory (TCAM) and static random access memory (SRAM). A hardware component may also include and/or be operatively connected to any number of physical network interfaces of a network device (100). Such interfaces may provide a path external to the network device (e.g., to other devices), and/or may be operatively connected to other components internal to the network device (100), and each such interface may be an ingress and/or egress interface.

As a non-limiting example, a hardware component may be and/or may include an ASIC that receives network traffic data units at an ingress port and, so long as no security policy—or MTU enforcement policy associated with a processing information that a given network traffic data unit is in-indicates that the network traffic data units should be dropped, determines out of which egress port on the network device (100) to forward the network traffic data units.

In one or more embodiments, a hardware component (108) includes functionality to support any level of indirection or up to a maximum number of levels of indirection in the processing information hierarchy.

In one or more embodiments, a hardware component (108) may store a programmed processing information hierarchy (110). The programmed processing information hierarchy (110) may be as originally provided by the processing information hierarchy provider (102) or may be a reorganized processing information hierarchy. In one or more embodiments, a programmed processing information hierarchy (110) is a processing information hierarchy that has been programmed, directly or indirectly, by a processing information hierarchy manager (104).

While FIG. 1 shows a configuration of components, other configurations may be used without departing from the scope of embodiments described herein. For example, there may be any number of processing information hierarchy providers. As another example, there may be any number of processing information hierarchy managers. As another example, there may be any number of hardware components, software instances, etc. that are not shown in FIG. 1. Accordingly, embodiments disclosed herein should not be limited to the configuration of components shown in FIG. 1.

To further clarify aspects of embodiments disclosed herein, a diagram of an example processing information hierarchy in accordance with one or more embodiments is shown in FIGS. 2.1-2.2. As discussed above, the example processing information hierarchy may be a data structure that includes information that may be used to respond to receipt of a network data unit. For example, the example processing information hierarchy may include information usable in connection with processing a network data unit.

As seen from FIG. 2.1, the example processing information hierarchy may include objects, i.e., processing information hierarchy object. Some of the objects may be linked to other objects as indicated by the arrows which may represent pointers.

To utilize the hierarchy, a network data unit may be matched to one of the first level objects (e.g., 202, 204, 206). The example processing information hierarchy may then be traversed, starting from the matched first level object. When traversing the example processing information hierarchy, actions may be performed and information may be obtained from one or more of the traversed objects. The traversal path may be identified via the arrows between each of the objects. Once traversed, appropriate information may be obtained and/or actions may have been performed to enable a hardware component programmed with the example processing information hierarchy to complete a desired task, e.g., processing a network data unit.

For example, consider a scenario in which first level object A (202) is matched based on characteristics of a network data unit. To traverse the example processing information hierarchy, actions and/or information associated with the first level object A (202) may be performed/obtained. Next, a traversal to the second level object B (212) is performed. Once traversed to the second level object B (212), actions and/or information associated with the second level object B (212) may be performed/obtained.

Here, second level object A (210) may require making a decision with respect to next traversing to third level object A (220) or third level object B (222) as indicated by the arrows between the second level object A (210) and the aforementioned third level objects. Second level object A (210) may include information that enables the traversal decision to be made (e.g., may include information to which a characteristic of the network data unit may be matched to make the traversal decision).

After making the traversal decision, traversal to the third level object A (220) or third level object B (222) may be performed based on the decision. This process may be repeated until an object (e.g., fourth level object A (240)) that is not linked to another object is reached and/or sufficient information and/or actions have been performed for the hardware component to complete a predetermined objective.

As seen from FIG. 2.1, when a processing information hierarchy provider provides a processing information hierarchy, the provided processing information hierarchy may include any number of objects. The provided processing information hierarchy may be highly functional in that it enables predetermined objectives to be performed but at the cost of having a structure that consumes more resources of hardware components for implementing the predetermined objectives than other structures.

Continuing with the example processing information hierarchy in FIG. 2.1 and referring to FIG. 2.2, the traversal of the processing information hierarchy via an order set of processing information hierarchy objects may be referred to as a processing path. For example, as shown in FIG. 2.2, there are two processing paths—Processing Path A and Processing Path B. Processing Path A includes first level object A (202), second level object A (210), third level object A (220), and fourth level object A (240). Processing Path B includes first level object A (202), second level object A (210), third level object B (222), and fourth level object B (242).

In one embodiment of the invention, the reorganization of the processing information hierarchy includes identifying: (i) duplicate (or duplicative) paths or portions thereof (i.e., one or more processing information objects, which may or may not be consecutively ordered, see e.g., FIGS. 5.1-5.2) and (ii) redundant processing information hierarchy objects. A duplicative portion refers to a portion of a first processing path that is identical to at least one portion of a second processing path. Two paths may include zero, one, or more duplicative portions. In scenarios in which two paths have two or more duplicative portions, the duplicative portions in each path may be separated by at least one non-duplicative portion.

A redundant processing information hierarchy object is a processing information object in a processing path that does not need to be performed and where its non-performance does not impact the result of traversing the processing path. Said another way, the result of traversing a first processing path that includes the redundant processing information hierarchy object and the result of traversing a second processing path (which is the same as the first processing path except that it does not include the redundant processing information hierarchy object) is the same. A given processing path may include zero, one, or more redundant processing information hierarchy objects.

Figure 3:
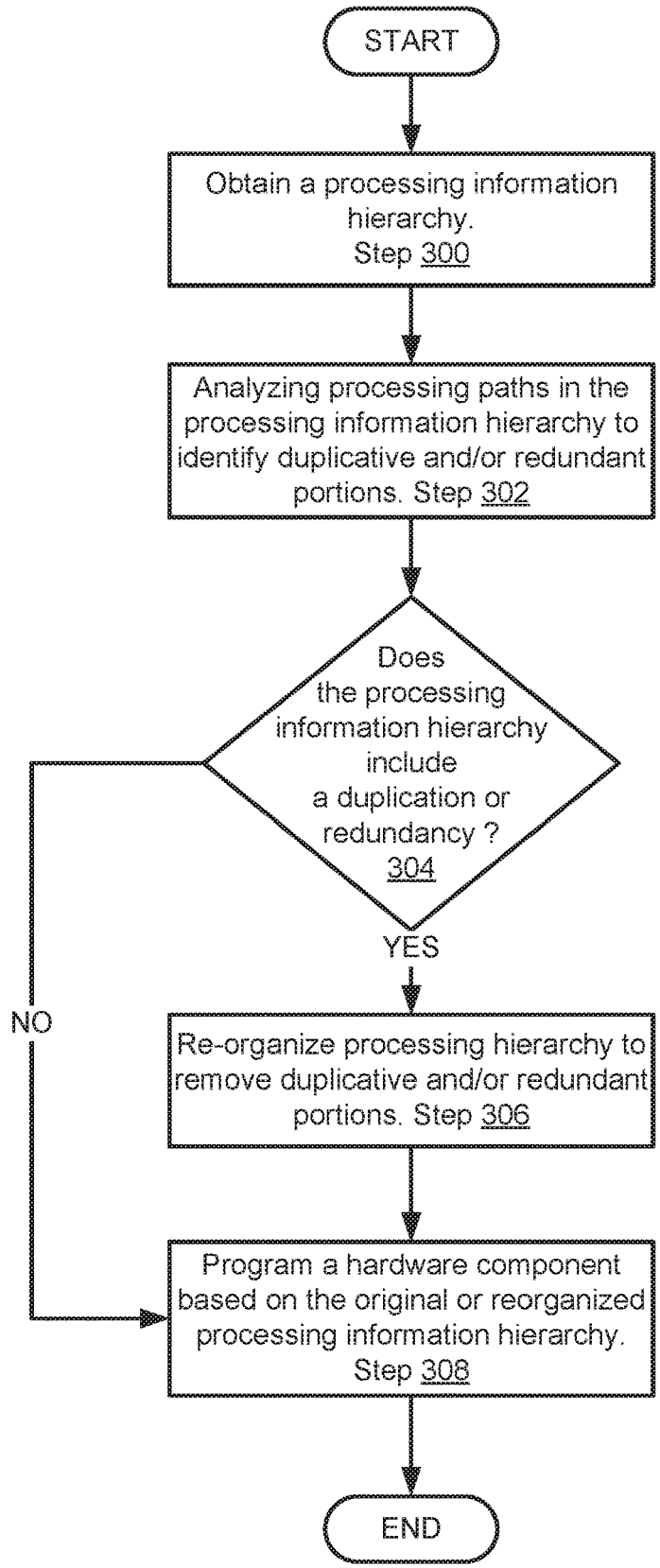
FIG. 3 shows a flowchart of a method that may be used to program a hardware component in accordance with one or more embodiments disclosed herein.

FIG. 3 shows a flowchart describing a method for deduplicating a Processing Information Hierarchy in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 300, a processing information hierarchy is obtained from a processing information hierarchy provider. In one or more embodiments, the processing information hierarchy is obtained by a processing information hierarchy manager. For example, the processing information hierarchy may be obtained by the processing information hierarchy manager from the processing information provider using inter-process communication.

In Step 302, the processing paths in the processing information hierarchy are analyzed to identify duplicative and/or redundant portions. With respect to identification of duplicative portions, for each identified processing path, a set of portions of the processing path are determined and then compared to portions of all other identified processing paths. In this manner, all portions (which may include zero, one, or more processing information hierarchy objects) of a given processing path are compared to all portions of the other processing paths in order to determine whether there are any duplicative portions. Any duplicative portions that are encountered are tracked in order that this information may be used in step 306. Other methods may be used for identifying redundant portions without departing from the invention.

With respect to identification of redundant portions, each of the processing paths is individually analyzed to determine whether any portion(s) (which may include zero, one, or more processing information hierarchy objects) may be removed from the processing path without impacting the result when the processing path is traversed without the portion(s). The identification of redundant portions may be based on previously identified portions that are known to be redundant. In this scenario, if a portion of a given processing path matches a previously identified portion that is known to be redundant, then the portion in the processing path is identified as being redundant. Any redundant portions that are encountered are tracked in order that this information may be used in step 306. Other methods may be used for identifying redundant portions without departing from the invention.

In step 304, a determination is made about whether the analysis in step 302 identified any duplicative and/or redundant portions. If duplicative and/or redundant portions were identified, the process proceeds to step 306; otherwise, the process proceeds to step 308.

In Step 306, the processing information hierarchy obtained is step 300 (also referred to as the original processing information hierarchy) is reorganized. The reorganization may include: (i) removing all redundant portions (if any were identified), (ii) removing all but one portion of the duplicate (or duplicative) portions (if any duplicative portions were identified), and (iii) linking the remaining processing information hierarchy objects after (i) and (ii) are performed.

Linking the remaining processing information hierarchy objects is performed in a manner that ensures that (i) the processing paths in the original processing information hierarchy are present in the reorganized processing information hierarchy and/or (ii) the processing paths in the reorganized processing information hierarchy generate the same result as the corresponding processing path in the original information hierarchy. With respect to (ii), depending on which processing information hierarchy objects need to be linked together, one or more additional processing information objects may need to be created and inserted into the reorganized processing information hierarchy. The additional processing information objects may include a consolidated object and a bidirectional informational object. A consolidated object is a processing information hierarchy object that is referenced by two or more higher level processing information objects (see e.g., FIG. 4.2. 480). A bidirectional object is a processing information hierarchy object that includes traversing to a lower level processing information hierarchy object and then traversing to a higher level processing information hierarchy object (see e.g., FIG. 5.2, Bidirectional Object A).

Other methods for generating the reorganized processing information hierarchy may be used without departing from the invention.

In Step 308, a hardware component is programmed based on the original processing information hierarchy (if the method proceeded directly from step 304 to 308) or based on the reorganized processing information hierarchy (if the method includes performing step 306). In one or more embodiments, programming a processing information hierarchy may include storing the original or reorganized processing information hierarchy in storage of the hardware component as a programmed processing information hierarchy. For example, the processing information hierarchy may be represented as any number of tables based on corresponding processing information hierarchy objects. The tables may be linked (e.g., as illustrated in FIG. 2.1) using pointers. Such tables may, for example, be stored in hardware tables of the hardware component.

The method may end following Step 308.

Example 1

To further clarify aspects of the embodiments disclosed herein, an example of deduplicating, reorganizing, and programming a processing information hierarchy is shown in FIGS. 4.1-4.2. The following example is for explanatory purposes only and not intended to limit the scope of embodiments described herein. Additionally, while the example shows certain aspects of embodiments described herein, all possible aspects of such embodiments may not be illustrated in this particular example.

FIG. 4.1 shows a diagram of a processing information hierarchy in accordance with embodiments disclosed herein. As seen from FIG. 4.1, the processing information hierarchy includes a first level object A (400), which is a highest level object, and a second level object A (410) which depends from the first level object A (400). A first dependency tree (470) depends from the second level object A (410). The first dependency tree includes a number of objects divided into a first branch (e.g., 420, 430, 450) and a second branch (e.g., 422, 432, 452).

The processing information hierarchy further includes a first level object C (402) and a second level object C (412) which depends from the first level object C (402). A second dependency tree (472) depends from the second level object C (412). The second dependency tree (472) includes a number of objects divided into a first branch (e.g., 424, 434, 454) and a second branch (e.g., 426, 436, 456). The aforementioned processing information hierarchy objects are organized into four processing paths in the processing information hierarchy.

Consider a scenario in which the second level object A (410) and the first dependency tree (470) are identical to the second level object C (412) and the second dependency tree (472). In such a scenario, via the method illustrated in FIG. 3, a processing information hierarchy manager identifies the second level objects along with the dependencies trees (470, 472) as being duplicative objects (460A, 460B).

Based on the identification, the processing hierarchy manager deduplicates the objects of the processing information hierarchy. FIG. 4.2 shows a diagram of the resulting reorganized processing information hierarchy. As seen from FIG. 4.2, the processing information hierarchy manager reorganized the processing information hierarchy to be adding a consolidated object (480) and a consolidated dependency tree (482); removing the second level objects and the dependency trees of FIG. 4.1; and modifying the first level object C (402) to point to the consolidated object (480) rather than the now removed second level object C (412). By doing so, the total number of objects to be programmed into a hardware component is greatly reduced without compromising the behavior of a hardware device programmed using the reorganized processing information hierarchy when compared to the behavior of the hardware device programmed using the processing information hierarchy shown in FIG. 4.1.

In this case, the consolidated object (480) is identical to the second level object A (410) and the consolidated dependency tree (482) is identical to the first dependency tree (470). Consequently, the consolidated object (480) and the consolidated dependency tree (482) may be generated by removing the second level object C (412) and the second dependency tree (472).

End of Example 1

Example 2

To further clarify aspects of the embodiments disclosed herein, an example of deduplicating, removing redundant processing information objects, reorganizing, and programming a processing information hierarchy is shown in FIGS. 5.1-5.2. The following example is for explanatory purposes only and not intended to limit the scope of embodiments described herein. Additionally, while the example shows certain aspects of embodiments described herein, all possible aspects of such embodiments may not be illustrated in this particular example.

Turning to FIG. 5.1, the processing information hierarchy includes eight processing paths (processing path A-H). The processing information hierarchy objects associated with each of the processing paths is summarized below in Table 1.

TABLE 1

| Processing Path | Processing Paths Processing Information Hierarchy Objects in Processing Path |
|---|---|
| A | L3 Address A, ECMP A, Entry A, Label A, L2 Address A |
| B | L3 Address A, ECMP A, Entry B, Label A, L2 Address B |
| C | L3 Address B, ECMP B, Entry C, Label B, L2 Address A |
| D | L3 Address B, ECMP B, Entry D, Label B, L2 Address B |
| E | Label A (Matching), ECMP C, Entry E, Label A, L2 Address A |
| F | Label A (Matching), ECMP C, Entry F, Label A, L2 Address B |
| G | Label B (Matching), ECMP D, Entry G, Label B, L2 Address A |
| H | Label B (Matching), ECMP D, Entry H, Label B, L2 Address B |

The processing information hierarchy is analyzed in accordance with the methods shown in FIG. 3 to identify the following duplicative processing information hierarchy objects. Specifically, [ECMP A, Entry A, L2 Address A] is duplicative of [ECMP B, Entry C, L2 Address A], [ECMP C, Entry E, L2 Address A], and [ECMP D, Entry G, L2 Address A]. Further, [ECMP A, Entry B, L2 Address B] is duplicative of [ECMP B, Entry D, L2 Address B], [ECMP C, Entry F, L2 Address B], and [ECMP D, Entry H, L2 Address B].

In addition to the duplicative processing hierarchy objects, the processing paths are analyzed to determine whether there are any redundant processing information hierarchy objects. In this example, Processing Path E, Label A that directly precedes L2 Address A is determined to be redundant as it results in a swap to the same label (i.e., Label A). Said another way, Processing Path E includes analyzing network traffic data units to determine whether its label matches Label A. If there is a match to Label A, then Label A already exists in the network traffic data units and no labeling swapping is required to be performed on this network traffic data units as the swap would result in Label A being removed and then rewritten to the network traffic data units. Accordingly, the processing information hierarchy object that is associated with the rewriting Label A is redundant. In addition, similarly situated processing information hierarchy objects related to Labels A and B in Processing Paths F, G, and H are also determined to be redundant.

Referring to FIG. 5.2, based on the analysis of the processing information hierarchy in FIG. 5.1, a reorganized processing information hierarchy is generated as shown in FIG. 5.2. Specifically, the reorganized processing information hierarchy does not include any of the redundant processing information hierarchy objects identified in FIG. 5.1. Further, the ECMP object and the related entry objects are consolidated into a single ECMP object that branches to Entry A and Entry B, which ultimately link to L2 Address A and L2 Address B, respectively. Because the ECMP processing across all processing paths in FIG. 5.1 is the same, a single set of processing information hierarchy objects may be used to handle ECMP processing across all processing paths. Moreover, because the subset of the processing paths require both ECMP processing and the insertion of a label (i.e., Label A or Label B), two bi-directional processing information hierarchy objects are created to permit insertion of a label following by the common ECMP processing.

As noted above, the reorganization of the processing information hierarchy should not change how the network traffic data units are processed across the various processing paths. To that end, the reorganized processing information hierarchy shown in FIG. 5.2 includes the same number of processing paths as FIG. 5.1, which perform the same processing of network traffic data units. Table 2 shows the processing paths in the reorganized processing information hierarchy, which map to the processing paths in the processing information hierarchy of FIG. 5.1

TABLE 2

Processing Paths in Reorganized Processing Information Hierarchy

| Processing Path | Processing Information Hierarchy Objects in Reorganized Processing Path |
|---|---|
| A | L3 Address A, Bidirectional Object A, Label A, Consolidated ECMP, Entry A, L2 Address A |
| B | L3 Address A, Bidirectional Object A, Label A, Consolidated ECMP, Entry B, L2 Address B |
| C | L3 Address B, Bidirectional Object B, Label B, Consolidated ECMP, Entry A, L2 Address A |
| D | L3 Address B, Bidirectional Object B, Label B, Consolidated ECMP, Entry B, L2 Address B |
| E | Label A, Consolidated ECMP, Entry A, L2 Address A |
| F | Label A, Consolidated ECMP, Entry B, L2 Address B |
| G | Label B, Consolidated ECMP, Entry A, L2 Address A |
| H | Label B, Consolidated ECMP, Entry B, L2 Address B |

As shown in Table 2, the reorganized processing information hierarchy preserves the processing paths of the processing information hierarchy. However, the reorganized processing information hierarchy only requires 13 processing information hierarchy objects as compared to the 32 processing information hierarchy objects required by the original processing information hierarchy.

End of Example 2

While embodiments described herein have been described with respect to a limited number of embodiments, those skilled in the art, having benefit of this disclosure, will appreciate that other embodiments can be devised which do not depart from the scope of embodiments described herein as disclosed herein. Accordingly, the scope of embodiments described herein should be limited only by the attached claims.

What is claimed is:

1. A network device, comprising:
a hardware component; and
a processor configured to:
obtain a processing information hierarchy;
make a determination that the processing information hierarchy comprises a duplication or a redundancy, wherein the duplication indicates that a first portion of a first processing path is identical to a second portion of a second processing path in the processing information hierarchy;
reorganize the processing information hierarchy based on the determination to obtain a reorganized processing information hierarchy; and
program the processing information hierarchy into the hardware component.

2. The network device of claim 1, wherein:
the duplication indicates that a first processing information hierarchy object of the processing information hierarchy is identical to a second processing information hierarchy object of the processing information hierarchy, and
reorganizing the processing information hierarchy in the hardware component comprises removing the first processing information hierarchy object or the second processing information hierarchy object.

3. The network device of claim 1, wherein the processing information hierarchy comprises a plurality of processing paths and an order of processing information hierarchy objects in at least one of the plurality of processing paths is modified during the reorganization of the processing information hierarchy.

4. The network device of claim 1, wherein the processing information hierarchy comprises a plurality of processing paths and wherein the reorganized processing information hierarchy preserves processing associated with the plurality of processing paths in the processing information hierarchy.

5. The network device of claim 1, wherein the processing information hierarchy comprises a redundancy when at least one processing information hierarchy object in at least one processing path in the processing information hierarchy may be removed without impacting a result of processing a network traffic data unit.

6. The network device of claim 1, wherein the first portion is a contiguous portion of the first processing path.

7. The network device of claim 1, wherein the first portion comprises non-contiguous processing information hierarchy objects of the first processing path.

8. A method, comprising:
obtaining a processing information hierarchy;
making a determination that the processing information hierarchy comprises a duplication or a redundancy, wherein the duplication indicates that a first portion of a first processing path is identical to a second portion of a second processing path in the processing information hierarchy;

reorganizing the processing information hierarchy based on the determination to obtain a reorganized processing information hierarchy; and programming the processing information hierarchy into a hardware component.

9. The method of claim 8, wherein:

the duplication indicates that a first processing information hierarchy object of the processing information hierarchy is identical to a second processing information hierarchy object of the processing information hierarchy, and reorganizing the processing information hierarchy in the hardware component comprises removing the first processing information hierarchy object or the second processing information hierarchy object.

10. The method of claim 8, wherein the processing information hierarchy comprises a plurality of processing paths and an order of processing information hierarchy objects in at least one of the plurality of processing paths is modified during the reorganization of the processing information hierarchy.

11. The method of claim 8, wherein the processing information hierarchy comprises a plurality of processing paths and wherein the reorganized processing information hierarchy preserves processing associated with the plurality of processing paths in the processing information hierarchy.

12. The method of claim 8, wherein the processing information hierarchy comprises a redundancy when at least one processing information hierarchy object in at least one processing path in the processing information hierarchy may be removed without impacting a result of processing a network traffic data unit.

13. The method of claim 8, wherein the first portion is a contiguous portion of the first processing path.

14. The method of claim 8, wherein the first portion comprises non-contiguous processing information hierarchy objects of the first processing path.

15. A non-transitory computer readable medium comprising instructions that, when executed by a processor, perform a method, the method comprising:

obtaining a processing information hierarchy;

making a determination that the processing information hierarchy comprises a duplication or a redundancy, wherein the duplication indicates that a first portion of a first processing path is identical to a second portion of a second processing path in the processing information hierarchy;

reorganizing the processing information hierarchy based on the determination to obtain a reorganized processing information hierarchy; and programming the processing information hierarchy into a hardware component.

16. The non-transitory computer readable medium of claim 15, wherein the processing information hierarchy comprises a plurality of processing paths and an order of processing information hierarchy objects in at least one of the plurality of processing paths is modified during the reorganization of the processing information hierarchy.

17. The non-transitory computer readable medium of claim 15, wherein the processing information hierarchy comprises a plurality of processing paths and wherein the reorganized processing information hierarchy preserves processing associated with the plurality of processing paths in the processing information hierarchy.

18. The non-transitory computer readable medium of claim 15, wherein the processing information hierarchy comprises a redundancy when at least one processing information hierarchy object in at least one processing path in the processing information hierarchy may be removed without impacting a result of processing a network traffic data unit.

19. The non-transitory computer readable medium of claim 15, wherein the first portion is a contiguous portion of the first processing path.

20. The non-transitory computer readable medium of claim 15, wherein the first portion comprises non-contiguous processing information hierarchy objects of the first processing path.

* * * * *